C. H. WILLIAMS.
HOE.
APPLICATION FILED MAY 17, 1916.
1,225,386.
Patented May 8, 1917.
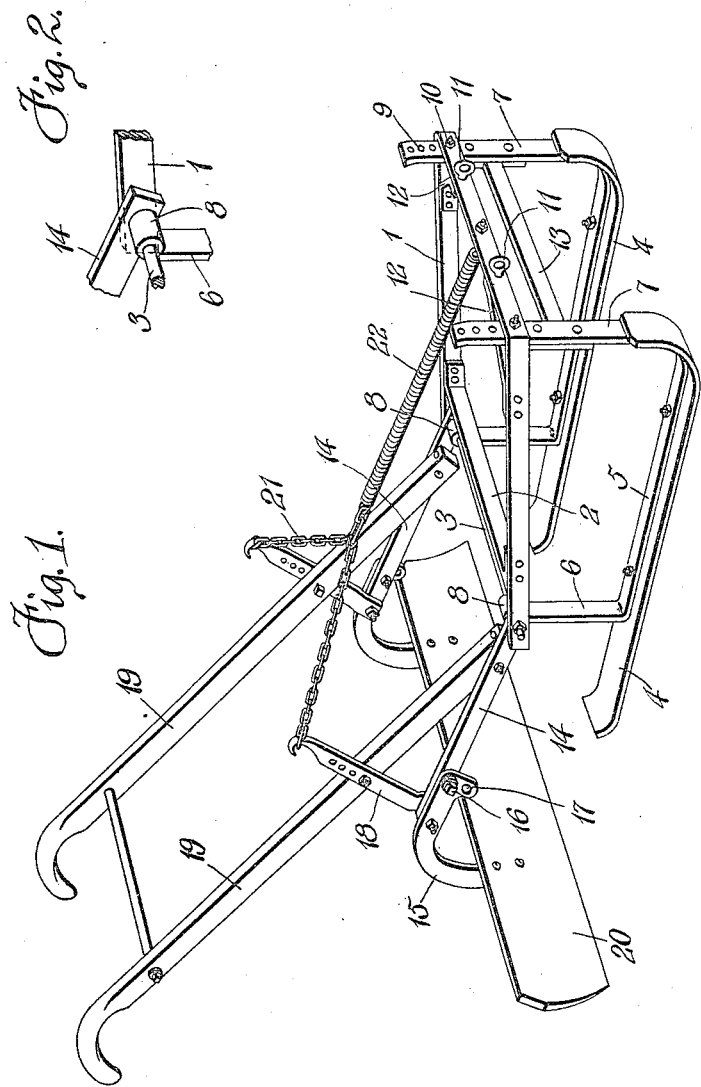
Inventor
Charles H. Williams.
By
[signature], Attorneys.

UNITED STATES PATENT OFFICE.

CHARLES H. WILLIAMS, OF FOWLER, CALIFORNIA.

HOE.

1,225,386.

Specification of Letters Patent.

Patented May 8, 1917.

Application filed May 17, 1916. Serial No. 98,156.

*To all whom it may concern:*

Be it known that I, CHARLES H. WILLIAMS, a citizen of the United States, residing at Fowler, in the county of Fresno and State of California, have invented certain new and useful Improvements in Hoes, of which the following is a specification.

This invention relates to agricultural implements and has for its object the provision of a simple and efficient device whereby the land which is left unplowed between adjacent vines in a vineyard may be treated so as to cut out undesired grass and weeds. In plowing vineyards, the plowing is confined to the space between the rows of vines or trees for the reason that, as now constructed, the plows or other ground-turning machines cannot pass between vines in the same row or close to the same without destroying the vines. As a result, there is a strip of ground left between the vines which is unturned and it is the object of my invention to provide a machine which may be readily drawn between adjacent vines so as to cut through and reduce to a level the ridge of unplowed ground.

The invention as I have practically devised the same is illustrated in the accompanying drawings, in which:

Figure 1 is a perspective view of a hoe embodying my improvements;

Fig. 2 is an enlarged detail perspective view of the joint between the main frame and the cultivator devices.

In carrying out my invention, I employ a main frame 1 which preferably consists of a metal bar bent into U-form to provide a front cross bar and sides extending from the ends of said cross bar. A rear cross bar 2 extends between and is rigidly secured to the sides of the frame 1 near the rear end of the same and a hinge rod 3 is inserted through the extremities of the side members of the frame 1 and may be secured therein by nuts or in any other convenient manner. Runners 4 are provided to support the main frame and permit the machine to glide readily over the surface of the ground, these runners being secured to the lower ends of side frames respectively consisting of a central base bar 5 and standards 6 and 7 rising from the rear and front ends respectively of the said base bar. The side frames are preferably each formed from a single length of material bent, adjacent its extremities, to provide a front and rear standard with the connecting portion between the said standards forming one of the base bars 5. These base bars seat against the runners 4 to extend longitudinally thereof and act to brace or reinforce the said runners. The upper extremities of the standard 6 are formed into eyes 8 which fit around the hinge rod 3 to thereby support the rear end of the main frame, while the front standards 7 are curved slightly rearwardly at their upper ends and are provided with longitudinal series of openings 9 to receive bolts, indicated at 10, whereby the front cross bar of the main frame may be secured to the said standards. By permitting this vertical adjustment of the front end of the main frame, I am enabled to accommodate the device to the height of the draft animals or the condition of the soil, so as to obtain proper draft, it being understood that the whiffletrees, or other suitable draft appliances are attached to the eye bolts or similar members 11 carried by the front end of the main frame. To reinforce the front portion of the main frame, angle brackets 12 are secured in the front corners of the same and a cross bar 13 is secured to and extends between the standards 7, as shown. Pivotally mounted upon the hinge rod 3 are the front ends of the beams 14 which extend rearwardly and have standards 15 adjustably secured to their rear extremities by means of bolts 16 passing through the heads 17 of the standards in a well-known manner. Hangers 18 are secured at their lower ends to the rear ends of the beams 14 and the upper ends of these hangers are adjustably secured to the handles 19 which extend to the beams 14 and are secured thereto near the front ends of the same. By adjusting the hangers 18 and then tightening the bolts which secure the lower front ends of the handle to the beams 14, the handles may be adjusted to the height of the operator or the blade set at any desired angular relation to the handle. The blade 20 is a steel plate having its lower edge formed into a cutting edge and its front surface concave. The blade is rigidly secured to the lower ends of the standards 15 and extends between and beyond the same, as clearly shown. A chain or similar device 21 is secured to the hook-shaped upper ends of the hangers 18 and extends forwardly therefrom to be connected with the rear end of a coil spring 22 which has its front end secured to the front end of the main frame. This spring tends to hold the handles and the blade in a somewhat elevated position so that the operator is not required to undergo the strain of lifting the handles and the blade when it is desired to remove the blade from the ground, as it is only necessary for him to release his hold upon the handles whereby the spring will contract and draw the blade from the ground.

The runners 4 should be long enough to bridge a furrow and rest on the ridges at the two sides of the furrow so that the machine will be drawn readily across the furrows and between the vines. The blade may be readily set to enter the ground to any desired depth and will cut through the ridge of earth thrown up from the furrow so as to cut out the weeds and grass and reduce the surface of the soil to a level condition. The blade may be held at such a depth that it will cut over the surface earth and spread the same, or it may be set to penetrate to a greater depth and, in that event, the loose earth will accumulate in front of the blade. When it is desired to discharge the load accumulated in this manner, the operator merely releases his hold upon the handles or applies a slight lifting impulse thereto so that the spring 22 will be free to act and will cause the blade to rise from and over the dirt as the machine continues its forward travel. The device is very simple in its construction and may be readily produced at a low cost and may be easily repaired or parts renewed, when necessary.

Having thus described the invention, what is claimed as new is:

1. An agricultural implement comprising spaced parallel runners adapted to span a furrow, standards secured rigidly to and rising from the runners adjacent the front and rear ends thereof, a main frame, a hinge rod pivotally connecting the rear end of the main frame with the rear standards with the front end of the said frame adjustably secured to the front standards for tilting the frame upon the standards, and a ground-treating blade supported from the rear end of the main frame by the said rod.

2. In an agricultural implement, the combination of a main frame comprising side members and front and rear cross bars connecting the side members, a hinge rod fitted in the rear extremities of the side members, a blade pivotally supported from the hinge rod, rear standards having their upper ends supporting the hinge rod with the said rod pivotally connecting the main frame with the said standards, front standards adjustably secured to the front portion of the main frame, and runners secured rigidly to the lower ends of said standards and disposed beneath the side members of the main frame and adapted to span a furrow.

3. In an agricultural implement, the combination of a main frame comprising side members and front and rear cross bars connecting the side members, a hinge rod fitting on the rear extremities of the side members, a blade pivotally supported from said hinge rod, rear standards having their upper ends supporting the hinge rod with the said rod pivotally connecting the main frame with the said standards, front standards adjustably secured to the main frame, longitudinally extending base bars connecting the lower ends of the standards, and runners each secured rigidly to one of said base bars.

4. A device of the character described including a main frame having side bars and front and rear cross bars with the said side bars projecting beyond the rear cross bars, means for supporting and permitting travel of the said main frame, beams fitting between and pivotally connected to the projecting portions of the side bars of the main frame, a blade connected with the outer extremities of said beams, handles pivotally connected to the said beams, hangers secured to the beams and extending above the handles with the said handles adjustably secured thereto for elevating the handles with respect to the beams, a spring secured to the front cross bar of the main frame, and a flexible connection between the said spring and the upper extremities of said hangers with the said spring normally tending to pivot the said beams upon the main frame and elevate the said blade.

5. A device of the character described including a main frame, means for supporting and permitting travel of the said main frame, beams pivotally connected to the main frame, a blade connected with said beams, handles pivotally connected with the beams, hangers secured to the said beams, means adjustably connecting the handles with the said hangers for elevating the handles with respect to the beams, and resilient means operatively connected with the said hangers and normally tending to pivot the beams upon the main frame for elevating the said blade.

In testimony whereof I affix my signature.

CHARLES H. WILLIAMS. [L. S.]